(12) United States Patent
Packer

(10) Patent No.: US 6,940,462 B2
(45) Date of Patent: Sep. 6, 2005

(54) BROADBAND DIPOLE ANTENNA TO BE WORN BY A USER AND ASSOCIATED METHODS

(75) Inventor: Malcolm J. Packer, Fairport, NY (US)

(73) Assignee: Harris Corporation, Melbourne, FL (US)

( * ) Notice: Subject to any disclaimer, the term of this patent is extended or adjusted under 35 U.S.C. 154(b) by 156 days.

(21) Appl. No.: 10/665,004

(22) Filed: Sep. 19, 2003

(65) Prior Publication Data

US 2005/0062659 A1 Mar. 24, 2005

(51) Int. Cl.[7] .................................................. H01Q 1/12
(52) U.S. Cl. ........................ 343/718; 343/792; 343/820
(58) Field of Search .................................. 343/718, 790, 343/792, 793, 820, 821, 822

(56) References Cited

U.S. PATENT DOCUMENTS

| | | | | |
|---|---|---|---|---|
| 2,576,128 A | | 11/1951 | Lense | 343/718 |
| 3,523,296 A | * | 8/1970 | Vliegenthardt | 343/718 |
| 3,902,118 A | | 8/1975 | Ikrath et al. | 325/118 |
| 4,041,394 A | * | 8/1977 | Pate | 455/100 |
| 4,205,319 A | | 5/1980 | Gasparaitis et al. | 343/792 |
| 4,496,953 A | | 1/1985 | Spinks, Jr. et al. | 343/792 |
| 4,730,195 A | | 3/1988 | Phillips et al. | 343/792 |
| 4,968,991 A | | 11/1990 | Yamazaki | 343/715 |
| 5,091,732 A | | 2/1992 | Mileski et al. | 343/797 |
| 5,220,341 A | | 6/1993 | Yamazaki | 343/901 |
| 5,628,057 A | | 5/1997 | Phillips et al. | 455/89 |
| 5,949,383 A | | 9/1999 | Hayes et al. | 343/795 |
| 6,215,448 B1 | | 4/2001 | DaSilva et al. | 343/703 |
| 6,356,238 B1 | * | 3/2002 | Gainor et al. | 343/718 |
| 6,424,820 B1 | | 7/2002 | Burdick et al. | 455/41 |
| 6,483,469 B2 | * | 11/2002 | Boyle | 343/718 |
| 6,531,988 B1 | | 3/2003 | Koyama | 343/718 |
| 6,552,692 B1 | | 4/2003 | Zeilinger et al. | 343/792 |
| 6,590,540 B1 | | 7/2003 | Adams et al. | 343/718 |
| 6,680,707 B2 | * | 1/2004 | Allen et al. | 343/718 |

OTHER PUBLICATIONS

Harris RF Communications Division, Rochester, NY; "RF–9072–A T001 Low Band VHF Discone Antenna"; © 2003 Harris Corp.; pp. 1–2.
Kamhik et al.; "Trival Antene AD–25/CW"; published at www.trival–antennes–masts.com.
Harris Corporation; "Tactical Radio Products RF–5800M/U Multiband Radio Family", pp. 1–3.
Harris Corporation; "Tactical Radio Products RF–5800V–HH Falcon II Advanced VHF Tactical Handheld Radio", © 2002 Harris Corp.; published Nov. 2002; pp. 1–2.
Thales Defense Ltd., Berkshire, U.K., "Panther EDR"; Publication No. 7308–2/0401/1347D; pp. 1–4.
Thales Defence Ltd., Berkshire, U.K., "Panther EDR VHF Tactical Communications System"; published online at www.thales–defence.co.uk.

* cited by examiner

Primary Examiner—Hoang V. Nguyen
(74) Attorney, Agent, or Firm—Allen, Dyer, Doppelt, Milbrath & Gilchrist, P.A.

(57) ABSTRACT

An antenna includes a dipole feed, a first dipole element connected to and extending outwardly from the dipole feed, a transmission line extending from the dipole feed in an opposite direction, and a flexible electrically conductive sleeve surrounding the transmission line and connected to and extending outwardly from the dipole feed. The electrically conductive sleeve may thus serve as a second dipole element and as a balun for the antenna. The antenna may by removably fastened to a garment of the user by at least one fastener, and the antenna may be connected to a radio also carried by the user. To enhance broadband performance, the dipole feed may include a broadband matching network, and the antenna may include a noise filter coupled to the transmission line adjacent an end of the flexible electrically conductive sleeve opposite the dipole feed.

32 Claims, 3 Drawing Sheets

BROADBAND DIPOLE ANTENNA TO BE WORN BY A USER AND ASSOCIATED METHODS

FIELD OF THE INVENTION

The present invention relates to the field of communications, and, more particularly, to an antenna that may be worn by a user.

BACKGROUND OF THE INVENTION

Portable radio communications are widely used to enable coordination between spaced apart users, such as policemen, fireman, or military personnel, for example. U.S. Pat. No. 2,576,128 to Lense issued Nov. 27, 1951 discloses an early version of a manpack antenna, such as for a soldier, that is in the form of a dipole including upper and lower dipole elements. These elements are centrally fed adjacent the waist of the user and extend upwardly toward the user's shoulder and downwardly to the user's knee. Such a large antenna may simply be too unwieldy for many applications.

A more advanced type of portable radio is known as the mini-manpack radio, such as the RF-5800V-HH VHF radio offered by Harris RF Communications Division of Rochester, N.Y. The five watt output mini-manpack handheld radio may be carried on a rear pack of the user. A conventional blade antenna extends upwardly from the radio. The user removes the radio from the pack and holds the radio in his hand during use.

In other similar portable radios, a short flexible rubber duck antenna may be used, however, performance may not be as good as with the blade antenna. Thales Defence Communications of the United Kingdom offers the Panther P (BCC 69) VHF frequency hopping secure EPM transceiver with such a relatively short rubber duck antenna. A long whip antenna may provide better performance, but may be unwieldy for the user. Accordingly, the blade antenna has served as a good compromise. Unfortunately, all these antenna types require a counterpoise provided by the radio itself. In addition, electromagnetic noise from interferers may limit sensitivity of the receiver of the radio.

Other approaches have been described for providing an antenna that is wearable by a user. For example, U.S. Pat. No. 6,590,540 to Adams et al. discloses RF elements attached to a garment so that the RF elements each form a band when the garment is worn. A shorting strap electrically connects the first and second RF elements on the back side of the garment. Unfortunately, such an antenna may not be suitable for longer range communications.

U.S. Pat. No. 4,730,195 to Phillips et al. discloses a shortened wideband antenna sleeve dipole antenna including a helically wound upper radiating element and an inductively loaded lower radiating sleeve element to reduce the linear size of the antenna. A helically wound feed coaxial transmission line is within the sleeve element. A matching network at the antenna feed point provides capacitive reactance above the antenna resonant frequency and inductive reactance below the antenna resonant frequency so that an impedance match is made between the feed coaxial transmission line and dual band performance is obtained.

U.S. Pat. No. 5,949,383 to Hayes et al. discloses an antenna formed on a substrate and including a center feed point. The feed section includes an RF input line and a ground line extending along the substrate and a balun extends along the substrate between the first radiating element and the ground line. Such an antenna may be not meet the durability requirements to be worn by a user or have sufficient power handling capability for longer range communication.

SUMMARY OF THE INVENTION

In view of the foregoing background, it is therefore an object of the present invention to provide an antenna that may be worn by a user and that provides good performance over a wide frequency band.

This and other objects, features and advantages in accordance with the present invention are provided by an antenna comprising a dipole feed, a first dipole element connected to and extending outwardly from the dipole feed, a transmission line extending from the dipole feed in an opposite direction, and a flexible electrically conductive sleeve surrounding the transmission line and connected to and extending outwardly from the dipole feed. The electrically conductive sleeve may thus serve as a second dipole element and as a balun for the antenna. The antenna may by removably fastened to a garment of the user by at least one fastener to define an antenna assembly. The antenna assembly may be coupled to a radio also carried by the user to define a portable communications system. To enhance broadband performance, the dipole feed may include a broadband matching network, and the antenna may include a noise filter coupled to the transmission line adjacent an end of the flexible electrically conductive sleeve opposite the dipole feed.

The noise filter may comprise at least one ferrite body coupled to the transmission line. In addition, the noise filter may also include a dielectric housing surrounding the at least one ferrite body. The noise filter and broadband matching network cooperate to provide broadband performance in a mechanically compact and robust unit.

The flexible electrically conductive sleeve may also be shape-retaining when formed into a shape having at least one bend therein. Accordingly, if the user were lying down, the conductive sleeve could be temporarily bent at a ninety degree angle so that the first dipole element remained vertically oriented for better performance. The flexible electrically conductive sleeve may comprise a pair of spirally wound, interlocking, electrically conductive elements, for example, to provide this shape-retaining property.

The first dipole element could also comprise a flexible electrical conductor. This flexible electrical conductor would not typically be shape retaining upon bending; rather, the flexible antenna could be flexed, but would be biased back to the straight position. The antenna may also include a connector coupled to an end of the transmission line opposite the dipole feed. The transmission line extending through the flexible sleeve may comprise a coaxial transmission line coupled to this connector.

The at least one fastener for removably fastening the antenna to the garment of the user may comprise a pair of fasteners adjacent opposing ends of the flexible electrically conductive sleeve. Each fastener may include an Alice clip to connect to the garment of the user, an Alice clip mounting bracket connected to the Alice clip, and a quick release knob carried by the Alice clip mounting bracket.

A method aspect of the invention is for making the antenna as described briefly above. The method may include coupling a first dipole element to and extend outwardly from a dipole feed in a first direction; coupling a transmission line to extend from the dipole feed in a second direction opposite the first direction; and providing a flexible electrically conductive sleeve surrounding the transmission line and coupled to and extending outwardly from the dipole feed to serve as a second dipole element and as a balun. The method may also include coupling a noise filter to the transmission line adjacent an end of the flexible electrically conductive sleeve opposite the dipole feed.

DETAILED DESCRIPTION OF THE PREFERRED EMBODIMENTS

The present invention will now be described more fully hereinafter with reference to the accompanying drawings in which preferred embodiments of the invention are shown. This invention may, however, be embodied in many different forms and should not be construed as limited to the illustrated embodiments set forth herein. Rather, these embodiments are provided so that this disclosure will be thorough and complete, and will fully convey the scope of the invention to those skilled in the art. Like numbers refer to like elements throughout, and prime notation is used to indicate similar elements in alternate embodiments.

Figure 1:
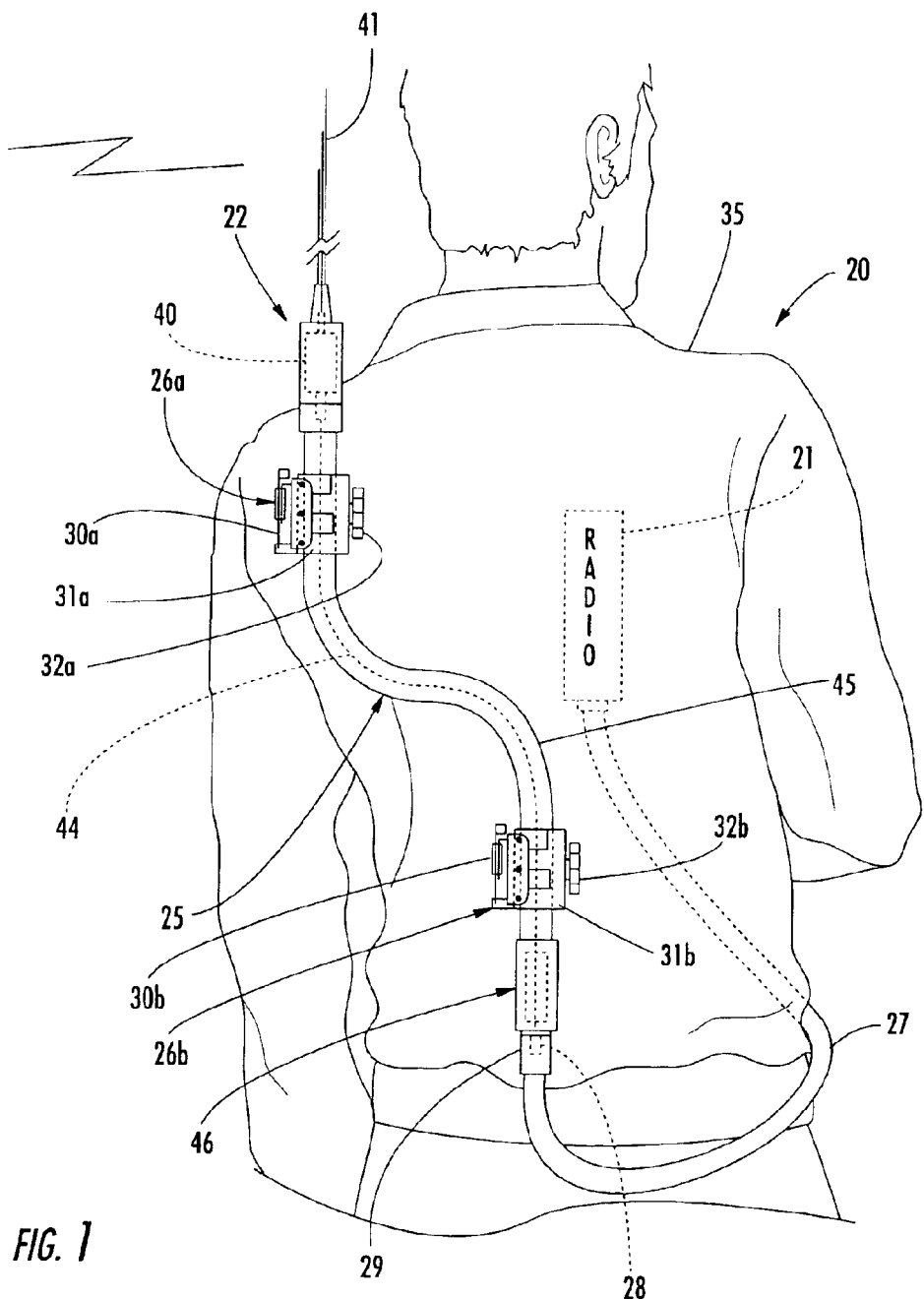
FIG. 1 is a rear view of a user carrying a communication system including the antenna in accordance with the present invention.

Referring initially to FIG. 1, the components of a portable communications system 20 in accordance with the invention are now described. The system 20 includes a radio 21, and an antenna assembly 22 connected to the radio. The radio 21 may be a portable unit, such as the model RF-5800V-HH that is a small, lightweight VHF handheld radio offered by Harris RF Communications Division of Rochester, N.Y., for example. The RF-5800V-HH operates over a broad frequency range of 30–108MHz. Other possible frequencies may be used by the radio 21, such as, for example, the 420–450 MHz band.

The antenna assembly 22 includes an antenna 25, a pair of upper and lower fasteners 26a, 26b and a coaxial cable 27 that connects the antenna 25 to the radio 21. Each of the fasteners 26a, 26b illustratively includes a conventional Alice clip 30a, 30b that removable connects typically to webbing or a vest (not shown), for example, or other garment worn by the user 35. For clarity of explanation, the fasteners 26a, 26b are illustrated in side view, that is rotated ninety degrees from the actual attached position as will be appreciated by those skilled in the art.

Each fastener 26a, 26b illustratively includes an Alice clip mounting bracket 31a, 31b connected to the Alice clip 20a, 30b, and a quick release knob 32a, 32B carried by the Alice clip mounting bracket. Of course, other configurations of fasteners 26a, 26b are also contemplated by the present invention to permit wearing of the antenna 25 by the user 35.

The user 35 may also sometimes wish to remove the antenna 35 and raise it to a higher position, for example, for better range. The fasteners 26a, 26b provide such flexibility to the user 35 as will be appreciated by those skilled in the art. In other embodiments, only a single fastener, or more than two fasteners may be used.

The antenna 25 includes a dipole feed illustratively comprising a broadband matching network 40 shown adjacent the upper fastener 26a. This broadband matching network 40 is further described-below with reference to FIG. 5 and helps provide broadband performance for the antenna 25.

The antenna 25 also includes a first dipole element 41 extending upwardly from the dipole feed matching network 40. This first dipole element 41 may be formed of a series of progressively longer strip-shaped conductors to provide flexibility to the element as will be appreciated by those skilled in the art. Accordingly, the first dipole element 41 may be folded for storage and transportation, but when released will spring to the fully extended position. For the VHF range described above, this first dipole element may have a length of about thirty-six inches, for example.

The antenna 25 also illustratively includes a transmission line 44 extending from the dipole feed broadband matching network 40 in a downward direction. In other words, the transmission line extends in a second direction opposite the first direction of the first dipole element 41. The antenna 25 also comprises a flexible electrically conductive sleeve 45 surrounding the transmission line 44 and connected to and extending outwardly from dipole feed matching network 40. This flexible electrically conductive sleeve 45 serves as a second dipole element and also as a balun to couple the unbalanced transmission line 44 to the dipole antenna elements as will be appreciated by those skilled in the art. For the VHF range described above, this flexible conductive sleeve 45 may have a length of about twenty-four inches, for example.

The antenna 25 also includes a noise filter 46 coupled to the transmission line 44 adjacent the lower end of the flexible electrically conductive sleeve 45. A connector 28 terminates the transmission line 44 at the noise filter 46 as shown. The connector 28 may be a BNC connector or any of a variety of suitable connectors as will be appreciated by those skilled in the art. A mating rotatable connector 29 illustratively connects the jumper coaxial cable 27 to the connector 28 at the noise filter 46. The rotatable connector 29 may permit the user 35 to swing the coaxial cable 27 to either the right or left side of his body for comfort or convenience. Other pairs of mating connectors, not shown, may be provided along the length of the jumper coaxial cable 27 in some embodiments.

Figure 2:
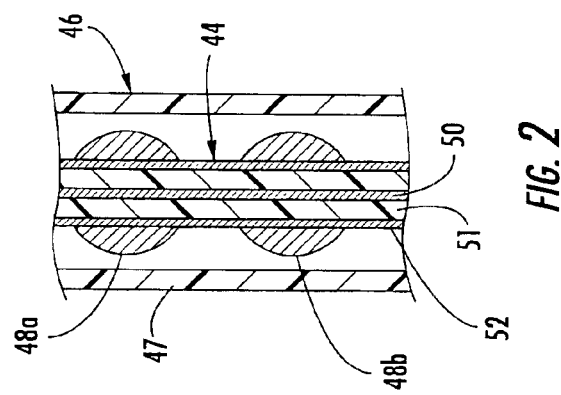
FIG. 2 is an enlarged cross-sectional view through the noise filter of the antenna as shown in FIG. 1.

This noise filter 44 reduces interfering noise delivered from the antenna 25 to the receiver in the radio 21 as will be appreciated by those skilled in the art. Referring briefly to FIG. 2, one embodiment of a suitable noise filter 46 is described. More particularly, the illustrated noise filter 46 includes a cylindrical dielectric housing 47 and a plurality of ferrite beads or bodies 48a, 48b surrounding the transmission line 44 and contained within the housing. Other configurations of noise filters are also contemplated by the present invention and will be apparent to those of skill in the art.

Figure 3:
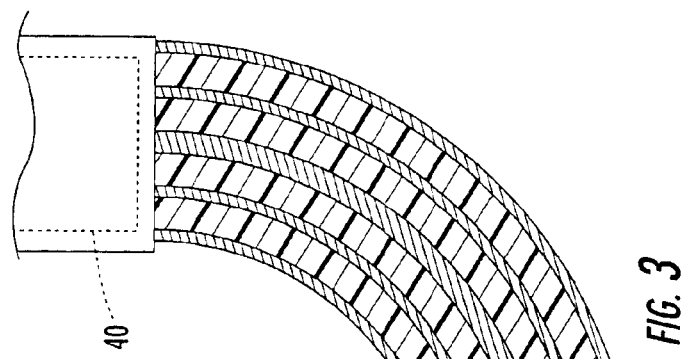
FIG. 3 is an enlarged cross-sectional view of a portion of the flexible electrically conductive sleeve of the antenna as shown in FIG. 1 and illustrating the sleeve in a temporarily bent shape.
Figure 4:
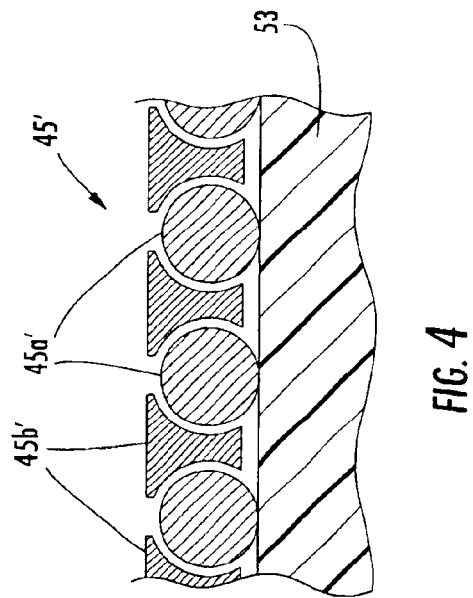
FIG. 4 is a greatly enlarged cross-sectional view through a sidewall portion of the flexible electrically conductive sleeve of the antenna shown in FIG. 1.

Referring now additionally to FIGS. 3 and 4, other aspects of the antenna 25 are now described. The transmission line 44 is illustratively provided by a coaxial arrangement of conductors. In particular, the transmission line 44 includes an inner conductor 50, a dielectric layer 51 surrounding the inner conductor, and an outer conductor 52 surrounding the dielectric layer. The flexible conductive sleeve 45 surrounds the transmission line 44 and is spaced therefrom by another dielectric layer 53 in the illustrated embodiment. Although the dielectric layer 53 is shown filing the space between the outer conductor 52 and the sleeve 45, in other embodiments the dielectric layer may be a thin layer on the outer conductor, or on the inside surface of the sleeve, and a space or air gap left between the thin dielectric layer and the adjacent conductive portion as will be appreciated by those skilled in the art.

The flexible electrically conductive sleeve 45 may also be shape-retaining when formed into a shape having at least one bend therein, such as shown by the ninety degree bend in FIG. 3. This bend is at the upper portion of the flexible electrically,conductive sleeve 45 between the upper fastener 26a and the dipole feed matching network 40. Accordingly, if the user were oriented in a prone position, the conductive sleeve 45 could be temporarily bent at a ninety degree angle so that the first dipole element 41 remained vertically oriented for better performance. It should be noted that the electrically conductive sleeve 45 may be readily bent by the user 35 to conform to his body. The sleeve 45 will also flex during movement by the user 35 so as not to be restrictive.

The flexible electrically conductive sleeve 45 may be formed of a solid conductor. In another preferred embodiment as shown in FIG. 4, the flexible sleeve 45' may comprise a pair of spirally wound, interlocking, electrically conductive elements 45a', 45b', for example. Other configurations are also envisioned as will be appreciated by those skilled in the art.

Figure 5:
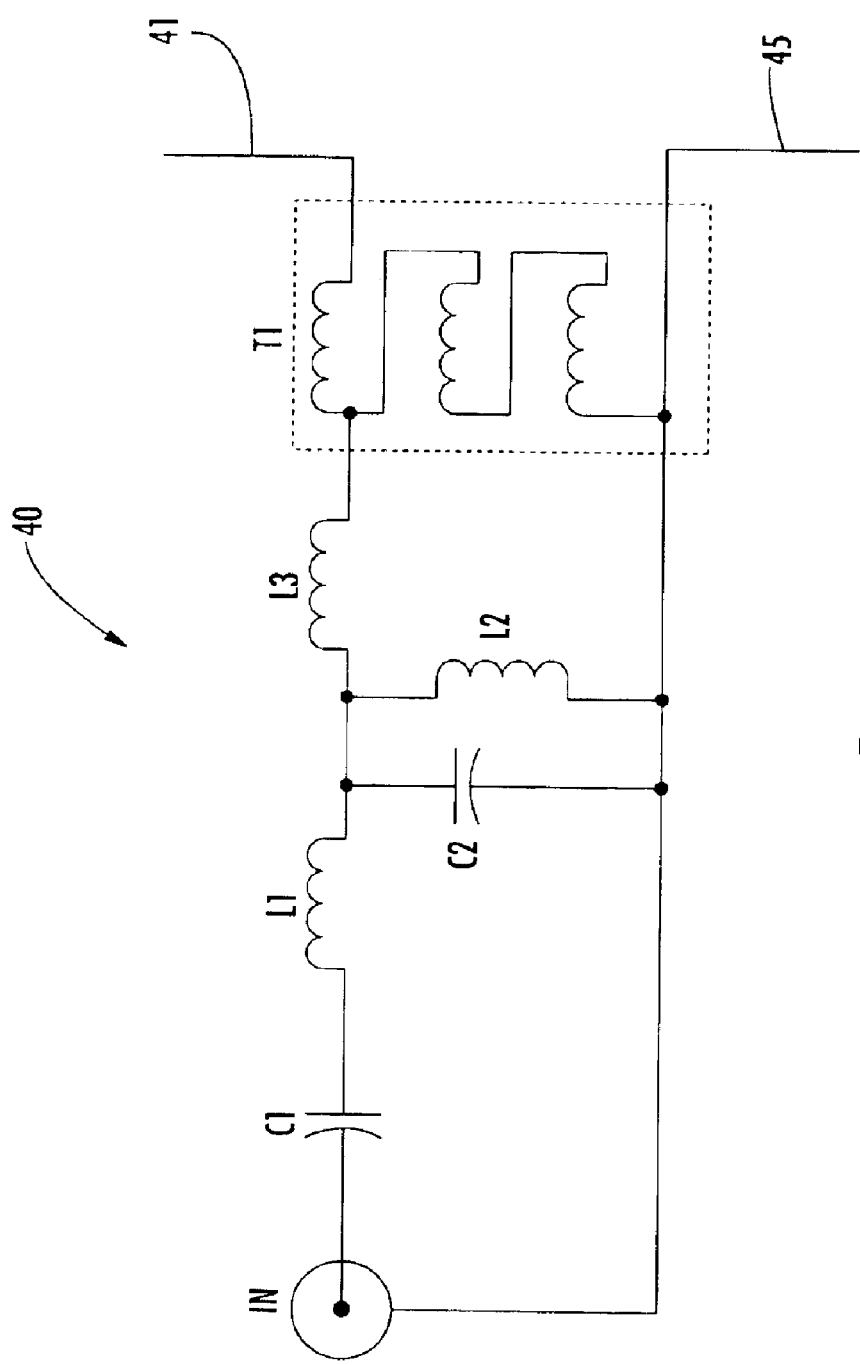
FIG. 5 is a schematic electrical diagram for a broadband matching network of the dipole feed of the antenna as shown in FIG. 1.

Turning now to FIG. 5, an embodiment of a dipole feed broadband matching network 40 is now described. The network 40 includes a three winding transformer T1 connected across the dipole elements 41 and 45. A first capacitor C1, a first inductor L1, and a third inductor L3 are connected in series between the inner conductor of the input IN and the transformer T1. A second capacitor C2 and second inductor L2 are connected in parallel with each other and across the input of transformer T1 between the first and third inductors L1, L3. The values of the various components is dependent on the frequency range of interest as will be appreciated by those skilled in the art without the need for further discussion. Other broadband matching networks 40 are also contemplated by the present invention. The illustrated network 40 has an advantage in that no resistors are used and therefore efficiency is higher than would otherwise result.

A method aspect of the invention is for making the antenna 25 as described herein. The method may include coupling a first dipole element 41 to and extend outwardly from a dipole feed 40 in a first direction; coupling a transmission line 44 to extend from the dipole feed in a second direction opposite the first direction; and providing a flexible electrically conductive sleeve 45 surrounding the transmission line and coupled to and extending outwardly from the dipole feed to serve as a second dipole element and as a balun. The method may also include coupling a noise filter 46 to the transmission line 44 adjacent an end of the flexible electrically conductive sleeve 45 opposite the dipole feed 40.

Many modifications and other embodiments of the invention will come to the mind of one skilled in the art having the benefit of the teachings presented in the forgoing descriptions and the associated drawings. Accordingly, it is understood that the invention is not to be limited to the embodiments disclosed, and that other modifications and embodiments are intended to be included within the spirit and scope of the appended claims.

That which is claimed is:

1. An antenna assembly to be worn by a user and comprising:
   an antenna comprising
      a dipole feed,
      a first dipole element connected to and extending outwardly from said dipole feed in a first direction,
      a transmission line extending from said dipole feed in a second direction opposite the first direction, and
      a flexible electrically conductive sleeve surrounding said transmission line and connected to and extending outwardly from said dipole feed to serve as a second dipole element and as a balun; and
   at least one fastener to removably fasten the antenna to a garment of the user.

2. An antenna assembly according to claim 1 wherein said dipole feed comprises a broadband matching network.

3. An antenna assembly according to claim 1 further comprising a noise filter coupled to said transmission line adjacent an end of said flexible electrically conductive sleeve opposite said dipole feed.

4. An antenna assembly according to claim 3 wherein said noise filter comprises at least one ferrite body coupled to said transmission line and a dielectric housing surrounding said at least one ferrite body.

5. An antenna assembly according to claim 1 wherein said flexible electrically conductive sleeve is also shape-retaining when formed into a shape having at least one bend therein.

6. An antenna assembly according to claim 1 wherein said flexible electrically conductive sleeve comprises a pair of spirally wound, interlocking, electrically conductive elements.

7. An antenna assembly according to claim 1 wherein said at least one fastener comprises a pair of fasteners adjacent opposing ends of said flexible electrically conductive sleeve.

8. An antenna assembly according to claim 1 wherein said at least one fastener comprises:
   an Alice clip to connect to the garment of the user;
   an Alice clip mounting bracket connected to said Alice clip; and
   a quick release knob carried by said Alice clip mounting bracket.

9. An antenna assembly according to claim 1 wherein said first dipole element comprises a flexible electrical conductor.

10. An antenna assembly according to claim 1 further comprising a connector coupled to an end of said transmission line opposite said dipole feed.

11. An antenna assembly according to claim 10 further comprising a length of coaxial coupled to said connector.

12. An antenna assembly according to claim 1 wherein said transmission line comprises a coaxial transmission line.

13. An antenna comprising:
   a dipole feed comprising a broadband matching network;
   a first dipole element connected to and extending outwardly from said dipole feed in a first direction;
   a transmission line extending from said dipole feed in a second direction opposite the first direction;
   a flexible electrically conductive sleeve surrounding said transmission line and connected to and extending outwardly from said dipole feed to serve as a second dipole element and as a balun; and
   a noise filter coupled to said transmission line adjacent an end of said flexible electrically conductive sleeve opposite said dipole feed.

14. An antenna according to claim 13 wherein said noise filter comprises at least one ferrite body coupled to said transmission line and a dielectric housing surrounding said at least one ferrite body.

15. An antenna according to claim 13 wherein said flexible electrically conductive sleeve is also shape-retaining when formed into a shape having at least one bend therein.

16. An antenna according to claim 13 wherein said flexible electrically conductive sleeve comprises a pair of spirally wound, interlocking, electrically conductive elements.

17. An antenna according to claim 13 wherein said first dipole element comprises a flexible electrical conductor.

18. An antenna according to claim 13 further comprising a connector coupled to an end of said transmission line opposite said dipole feed.

19. An antenna according to claim 13 wherein said transmission line comprises a coaxial transmission line.

20. A communications system comprising:
   a radio to be carried by a user;
   an antenna to be worn by the user and connected to said radio, said antenna comprising
      a dipole feed,
      a first dipole element connected to and extending outwardly from said dipole feed in a first direction,
      a transmission line extending from said dipole feed in a second direction opposite the first direction, and
      a flexible electrically conductive sleeve surrounding said transmission line and connected to and extending outwardly from said dipole feed matching network to serve as a second dipole element and as a balun; and
   at least one fastener to removably fasten said antenna to a garment of the user.

21. A communications system according to claim 20 wherein said dipole feed comprises a broadband matching network.

22. A communications system according to claim 20 further comprising a noise filter coupled to said transmission line adjacent an end of said flexible electrically conductive sleeve opposite said dipole feed.

23. A communications system according to claim 22 wherein said noise filter comprises at least one ferrite body coupled to said transmission line and a dielectric housing surrounding said at least one ferrite body.

24. A communications system according to claim 20 wherein said flexible electrically conductive sleeve is also shape-retaining when formed into a shape having at least one bend therein.

25. A communications system according to claim 20 wherein said flexible electrically conductive sleeve comprises a pair of spirally wound, interlocking, electrically conductive elements.

26. A communications system according to claim 20 wherein said at least one fastener comprises a pair of fasteners adjacent opposing ends of said flexible electrically conductive sleeve.

27. A communications system according to claim 20 wherein said first dipole element comprises a flexible electrical conductor.

28. A communications system according to claim 20 further comprising:
   a connector coupled to an end of said transmission line opposite said dipole feed; and
   a length of coaxial coupled between said connector and said radio.

29. A method for making an antenna comprising:
   coupling a first dipole element comprising a broadband matching network to and extend outwardly from a dipole feed in a first direction;
   coupling a transmission line to extend from the dipole feed in a second direction opposite the first direction;
   providing a flexible electrically conductive sleeve surrounding the transmission line and coupled to and extending outwardly from the dipole feed to serve as a second dipole element and as a balun; and
   coupling a noise filter to the transmission line adjacent an end of the flexible electrically conductive sleeve opposite the dipole feed.

30. A method according to claim 29 wherein the flexible electrically conductive sleeve is also shape retaining.

31. A method according to claim 29 wherein the first dipole element comprises a flexible electrical conductor.

32. A method according to claim 29 further comprising coupling a connector to an end of the transmission line opposite the dipole feed.

* * * * *